United States Patent [19]

Kanai et al.

[11] Patent Number: 4,613,918

[45] Date of Patent: Sep. 23, 1986

[54] PERPENDICULAR MAGNETIC PLAYBACK HEAD AND A PERPENDICULAR MAGNETIC RECORDING AND REPRODUCING DEVICE

[75] Inventors: Kenji Kanai, Neyagawa; Seishi Sasaki, Nishinomiya; Ken Takahashi, Suita; Ryuji Sugita, Hirakata, all of Japan

[73] Assignee: Matsushita Electric Industrial Co., Ltd., Tokyo, Japan

[21] Appl. No.: 483,614

[22] Filed: Apr. 11, 1983

[30] Foreign Application Priority Data

| | | | |
|---|---|---|---|
| Apr. 14, 1982 | [JP] | Japan | 57-62728 |
| Apr. 14, 1982 | [JP] | Japan | 57-62731 |
| Apr. 20, 1982 | [JP] | Japan | 57-66699 |
| Oct. 14, 1982 | [JP] | Japan | 57-180720 |
| Oct. 14, 1982 | [JP] | Japan | 57-180724 |
| Oct. 14, 1982 | [JP] | Japan | 57-180721 |
| Oct. 14, 1982 | [JP] | Japan | 57-180728 |
| Oct. 14, 1982 | [JP] | Japan | 57-180730 |
| Oct. 14, 1982 | [JP] | Japan | 57-180731 |

[51] Int. Cl.$^4$ .......................... G11B 5/12; G11B 5/30

[52] U.S. Cl. .................................. 360/113; 324/252; 338/32 R

[58] Field of Search ............... 360/113, 119, 122, 125, 360/126; 324/252; 338/32 R

[56] References Cited

U.S. PATENT DOCUMENTS

| | | | |
|---|---|---|---|
| 3,019,125 | 1/1962 | Eggenberger et al. | 360/131 X |
| 4,127,884 | 11/1978 | Nouchi et al. | 360/119 |
| 4,253,127 | 2/1981 | Kodama et al. | 360/125 |
| 4,300,177 | 10/1981 | Koel et al. | 360/113 |
| 4,317,148 | 2/1982 | Chi | 360/119 |
| 4,383,284 | 5/1983 | Isshiki | 360/125 |
| 4,413,297 | 11/1983 | Tanaka et al. | 360/119 |
| 4,423,450 | 12/1983 | Hamilton | 360/111 |
| 4,425,593 | 1/1984 | Postma | 360/113 |
| 4,441,131 | 4/1984 | Osanai | 360/119 |
| 4,477,794 | 10/1984 | Nomura et al. | 338/32 R |

FOREIGN PATENT DOCUMENTS

| | | | |
|---|---|---|---|
| EPA21392 | 1/1981 | European Pat. Off. | 360/113 |
| 2650484 | 6/1977 | Fed. Rep. of Germany | 360/113 |
| 57-100606 | 6/1982 | Japan | 360/113 |
| 57-111821 | 7/1982 | Japan | 360/113 |

*Primary Examiner*—Stuart N. Hecker
*Assistant Examiner*—Benjamin E. Urcia
*Attorney, Agent, or Firm*—Stevens, Davis, Miller & Mosher

[57] ABSTRACT

A magneto-resitive playback head and a recording and reproducing device for reproducing a recording signal from a double-layered film type perpendicular magnetic recording medium. The playback head includes a magneto-resistive element included in high-permeability thin films and having one end portion facing the recording medium. The magneto-resistive element exhibits a magneto-resistance effect responsive to magnetic fluxes generated from signal magnetization in the recording medium. The head also includes electrodes for supplying an electric current longitudinally of the magneto-resistive element, and high-permeability members for introducing the signal magnetic fluxes passed through the magneto-resistive element again to the recording medium. A magnetic recording and reproducing device comprises the playback head, a thin film magnetic recording head, a recording circuit, a playback circuit, and a driving circuit which gives a relative motion between the medium and the heads.

22 Claims, 26 Drawing Figures

PERPENDICULAR MAGNETIC PLAYBACK HEAD AND A PERPENDICULAR MAGNETIC RECORDING AND REPRODUCING DEVICE

BACKGROUND OF THE INVENTION

The present invention relates to a playback head of magnetoresistive type suitable for reproducing signals recorded in a perpendicular magnetic recording medium, or more in particular to a perpendicular magnetic recording and reproducing system using the playback head and a magnetic recording and reproducing device using the perpendicular magnetic recording system.

It is known that the perpendicular or vertical magnetic recording system is expected to have a remarkably improved recording density as compared with the prior art longitudinal or horizontal recording system.

Examples of conventional perpendicular magnetic recording systems will be described below. FIG. 1 (*a*) shows a perpendicular head. Reference numeral 1 designates a main pole made of a ferromagnetic film such as permalloy. Explanation will be here by reference to a recording medium of the double-layered film type which is said to have a large output. Numeral 2 designates a perpendicular recording medium such as CoCr film with axis of easy magnetization in the direction perpendicular to the film surface, numeral 3 a lining layer of soft magnetic material such as permalloy, and numeral 4 a base film such as polyethylene terephathalate (PET).

Numeral 5 designates an auxiliary magnetic pole made of a ferromagnetic material such as ferrite, and numeral 6 a coil wound around the auxiliary magnetic pole 5.

When a signal current is applied to the coil 6 at the time of recording, the auxiliary magnetic pole 5 of the vertical magnetic head of this construction is magnetized, and the resulting magnetic fluxes reach the main pole 1 through the soft magnetic layer thereby to strongly magnetize the forward end of the main pole 1. As a result, the recording film 2 of CoCr is magnetized in the perpendicular direction.

The arrows in FIG. 1 (*a*) indicate the flow of magnetic fluxes. At the time of reproduction, a reproduction voltage is generated across the coil 6 through processes opposite to those mentioned above. This system has the advantage that since a very sharp perpendicular magnetic field is capable of being generated at the time of recording, an ideal perpendicular recording is possible. In spite of this advantage, the disadvantage of this system is a low reproduction efficiency since the magnetic circuit is open at the time of reproduction.

FIG. 1 (*b*) shows another example of the conventional systems, in which a ring head usually used for longitudinal recording is used for perpendicular recording. Numeral 7 designates a ring head core. In the recording process, the system utilizes vertical components of the magnetic fields generated by the ring head. The reproduction process, on the other hand, is performed in a manner similar to the conventional longitudinal recording. In the system, a considerable amount of oblique components of the magnetic field strength are generated by the ring head in the recording process, and therefore an ideal perpendicular recording is impossible, although considerably satisfactory recording characteristics are obtained if the anisotropy of the perpendicular recording medium is high. On the other hand, the reproduction efficiency is high due to the closed magnetic circuit construction.

The common disadvantage of these two conventional systems is the thickness loss of the main pole for the perpendicular head and the gap loss for the ring head. These losses are attributable to the thickness of the main pole and to the gap length of the ring head respectively as expressed below, and zero points arise in wavelength response (wavelength versus loss characteristic). This is illustrated in FIG. 2.

$$\text{Loss (dB)} = 20 \log \frac{\sin \pi l/\lambda}{\pi l/\lambda}, \ \lambda_{on} = \frac{l}{n}$$

where $\lambda_{on}$ is the wavelength at zero point, l the gap length or the thickness of the main pole, n an integral number and λ the wavelength. It will be seen from this that if the loss in a short wavelength region is to be reduced, it is necessary to reduce the gap length or, as the case may be, the thickness of the main pole. In either case, the reproduction efficiency is decreased proportionately.

If the number of turns of the winding is increased to improve the reproduction sensitivity, the self-resonance frequency is reduced by an increase of head inductance. With a decrease of recording wavelength, on the other hand, the signal frequency is increased, and therefore the reduction in the self-resonance frequency of the magnetic head is very disadvantageous for signal reproduction.

By reason of this limitation in reducing the gap length or the thickness of the main pole, the reproduction spectrum of such a head takes the form as shown in FIG. 2. In the case where a null point exists in the reproduction spectrum, the use of a region of shorter wavelength requires a special encoding system.

As a solution of this problem, an encoding system (partial response system) which permits the use of the reproduction head in the short wavelength region below or not longer than the zero-point wavelengths is under study. This encoding system has shortcomings that (1) a special encoding process is required, (2) the use of a high-order peak of wavelength response results in an interruption of the wavelength response spectrum, and (3) the output of the high-order peak is much lower than in the long wavelength region.

Another great common problem of electromagnetic induction type heads is that in the case of low relative speeds of the head and the recording medium, the reproduction output voltage is low, thereby necessitating an increase in the number of turns of winding. In the multi-track construction with a multiplicity ofmagnetic heads in juxtaposition, on the other hand, the space occupied by the winding poses the problem. Further, in the construction using thin film techniques, the number of turns in a winding is limited, thus making it impossible to realize a high-sensitivity reproduction head.

As a solution to these problems, a head utilizing magnets-resistive effect (hereinbelow abbreviated as MR head, and magneto-resistive element as MR element) is of interest. The conventional MR heads include an MR-element alone type MR head in which current is supplied longitudinally of an MR element in strip form, the MR element is arranged perpendicular to a recording medium, and a signal magnetic field enters the surface of the element in the direction perpendicular to the longitudinal direction. In the MR head of this type, it is known that the wavelength response characteristic, attributable solely to the head construction, is determined by the width w of the magneto-resistive element. In order to sufficiently reduce the wavelength loss, the element width w is required to be almost equal to the wavelength λ. This is very disadvantageous in respect of the working tolerance for manufacture of a head intended for short wavelengths as well as for wear tolerance of the magnetic head. Another conventional type of MR head is of a shield type, in which magnetic materials of high magnetic permeability are disposed on both sides along the thickness of an magneto-resistive element. The MR head of this type exhibits substantially the same wavelength response as the conventional winding head of ring type and is known to be usable with high sensitivity up to a considerably short wavelength. Nevertheless, the magnetic and electric isolation is required between the magneto-resistive element and the high-permeability magnetic materials on the sides thereof, and the thicknesses $g_1$ and $g_2$ of the insulation layers therebetween correspond to the gap length of the conventional ringtype winding head. Further, the gap loss of $g_1$ is multiplied by the gap loss of $g_2$ approximately, and therefore, if the gap loss for the short wavelength is to be sufficiently reduced, both the values $g_1$ and $g_2$ are required to be reduced extremely. Under this condition, it is very difficult to form a narrow gap free of magnetic or electric leaks.

As will be seen from the above description, in spite of the fact that the perpendicular magnetic recording system has a superior recording characteristic, a superior playback head for the system which is capable of reproducing very short wavelengths efficiently has been not yet developed. The available perpendicular magnetization reproduction system or the perpendicular magnetic recording and reproducing apparatuses equipped with such a playback head are not satisfactory.

SUMMARY OF THE INVENTION

Accordingly, it is an object of the present invention to provide a playback head of magneto-resistive type wherein loss due to the width of the MR element (hereinbelow abbreviated as MR width loss) of the magneto-resistive head of MR-element alone type and the gap loss of the magneto-resistive element of shield type can be obviated and the reproduction is possible up to very short wavelengths.

Another object of the present invention is to provide a magnetic recording and reproducing system with an improved short-wavelength recording and reproducing characteristic, which substantially obviates the gap loss or MR width loss as caused in conventional magnetic recording and reproducing systems.

Still another object of the present invention is to provide a magnetic recording and reproducing apparatus using the above-mentioned magnetic recording and reproducing system superior in the short-wavelength recording and reproducing characteristics.

In order to achieve the above-mentioned objects, the device according to the present invention comprises (a) a recording medium magnetically recorded perpendicularly, and (b) a playback head of magneto-resistive type including (c) a plurality of thin films of high permeability including a thin film with one end facing the recording medium, (d) an MR element included in the thin films of high permeability and exhibiting a magneto-resistance effect by magnetic fluxes generated from signal magnetization of the recording medium, (e) means for supplying an electric current in the longitudinal direction of the MR element, and (f) a material of high permeability for introducing the signal magnetic fluxes passed through the MR element into the recording medium again.

In the perpendicular magnetization reproducing system using the playback head of magneto-resistive type according to the present invention, the magnetic fluxes generated by signal magnetization recorded in a double-layered perpendicular recording medium are introduced to the lower ends of the high permeability thin films, and through the MR element, material of high permeability, and soft magnetic material layer on the back of the recording medium, returns to the lower ends of the thin films of high permeability in a closed loop, so that the MR width loss of the MR element alone type head and the gap loss of the shield-type MR head can be substantially obviated.

Thus, the magnetic recording and reproducing device according to the present invention is capable of recording and reproduction of very short wavelengths, fully taking advantage of the high density recording characteristic of the perpendicular magnetic recording.

BRIEF DESCRIPTION OF THE DRAWINGS

The present invention is further explained with the accompanying drawings, in which:

FIG. 19 (*b*) shows a schematic view of the surface of a foundation for the MR thin film;

DETAILED DESCRIPTION OF PREFERRED EMBODIMENTS

Figure 3:
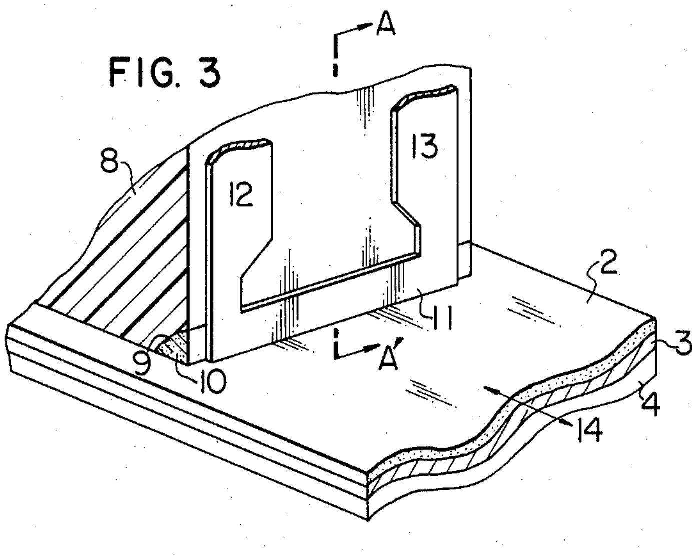
FIG. 3 shows a first embodiment of the present invention.
Figure 4:
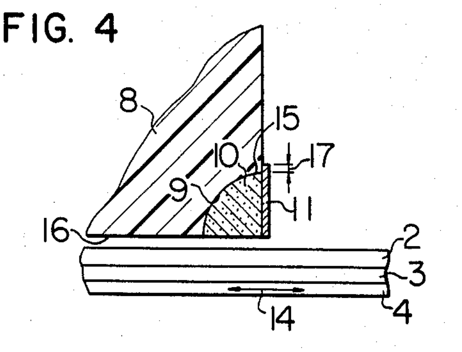
FIG. 4 is a sectional view taken in line A—A' in FIG. 3.

Embodiments of the present invention will be explained below with reference to the accompanying drawings. FIGS. 3 and 4 show an embodiment of the present invention, and FIG. 4 is a sectional view taken in line A—A' in FIG. 3. As shown in the drawings, a recessed groove 9 is formed in the surface of an insulative magnetic base plate or substrate 8 such as ferrite, and the groove 9 is filled with a non-magnetic material 10 to align with the surface of the base plate 8. On the new surface thus finished an Ni-Fe alloy is deposited to the thickness of about 500 Å by evaporation means. Electrodes 12 and 13 are arranged at longitudinal ends of a substantially rectangular-shaped MR element 11 by photoetching technique, and the MR element 11 is disposed in parallel to the recessed groove 9. Upper end of the MR element 11 is magnetically coupled with upper end 15 of the groove 9 formed in the magnetic base plate 8 by coupling portion 17, while lower end of the MR element 11 faces the recording medium 2, that is in contact with the medium 2.

Numeral 3 designates a soft magnetic material layer provided on the back surface of the recording medium 2. The surface 16 of the magnetic base plate 8 approximately at a right angle to the MR element 11 faces the medium 2. The arrow 14 indicates the running direction of the recording medium 2.

Further, though not shown, a thick protective film such as SiO is deposited by evaporation on the MR element 11 and glass is bonded therewith by a bonding agent thereby to keep the side surfaces of the MR element 11 shielded from surrounding air.

In this construction, the magnetic fluxes generated from the signal magnetization recorded in the perpendicular recording medium 2 flow to draw a closed loop starting from the lower end of the MR element 11, through the body of MR element 11, to the end 15 of the groove 9 in the base plate 8 from the upper end of the element 11, further to the surface 16 of the medium 11 through the flux return yoke comprised of base plate 8, and returns to the medium 2, further through the soft magnetic material layer 3 on the back of the medium to the lower end of the MR element 11.

As a result, the MR width loss which is a problem inherent to the MR element alone type excited in response to a spatial magnetic field and the gap loss of the shield-type MR element can be substantially obviated.

Figure 5:
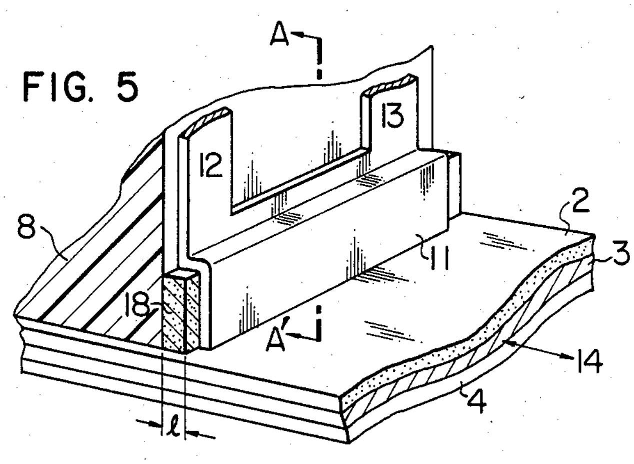
FIG. 5 is a diagram showing a second embodiment of the present invention.
Figure 6:
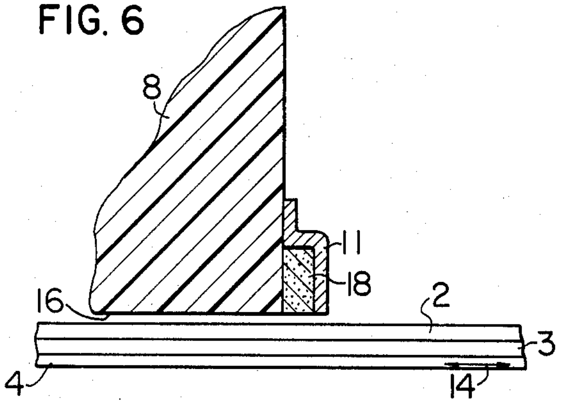
FIG. 6 is a sectional view taken in line A—A' in FIG. 5.

A second embodiment of the present invention will be described with reference to FIGS. 5 and 6.

A non-magnetic material 18 such as $SiO_2$ or $Al_2O_3$ is deposited to the thickness of about 10 to 100 $\mu$m by sputter means or the like on an insulative magnetic base plate 8 such as ferrite. Ni-Fe alloy forming the MR element is deposited by evaporation means to the thickness of about 500 Å on the resulting assembly, and electrodes 12, 13 are arranged at longitudinal ends of the MR element 11 by photoetching. The sectional view taken in line A—A' in FIG. 5 is shown in FIG. 6. An upper end portion of the MR element 11 is magnetically coupled with the ferrite base plate 8, while the lower end thereof faces the recording medium 2. The surface 16 of the magnetic base plate 8 approximately at a right angle to the MR element 11 faces the recording medium 2. The arrow 14 indicates the feeding direction of the recording medium.

By constructing the system in this way, the magnetic fluxes generated by the signal magnetization recorded in the perpendicular recording medium 2 are introduced from the lower end of the MR element 11, and through the body of MR element 11, led to a part thereof where the non-magnetic material 18 is not deposited from the upper end thereof, and further through the base plate 8, through the surface 16 thereof facing the recording medium 2 to return to the medium 2. The fluxes further, return, through the soft magnetic layer 3 on the back of the recording medium 2, to the lower end of the MR element 11 to complete a closed loop. As a result, the effect similar to that of the first embodiment is obtained.

A third embodiment is now described. The second embodiment requires a high technique to produce a film of uniform thickness on a stepped portion formed by the base plate 8 and the non-magnetic material 18 in the process of depositing the Ni-Fe alloy material (magneto-resistive element) 11. This inconvenience can be obviated by the third embodiment described below.

Figure 7:
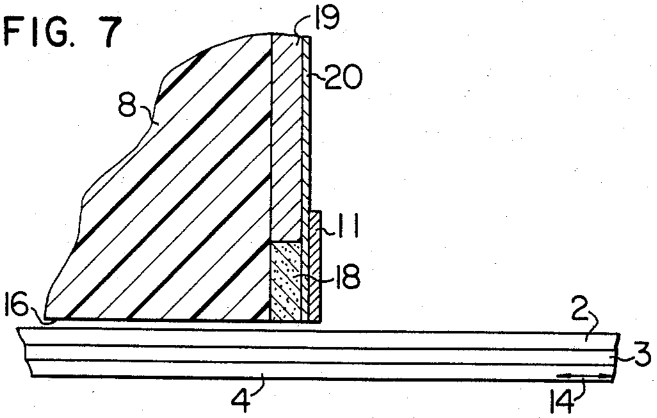
FIGS. 7 and 8 show third and fourth embodiments of the present invention respectively.

FIG. 7 shows a thin film magnetic head according to a third embodiment of the present invention. In FIG. 7, the component elements similar to those contained in FIG. 6 are designated by the same reference numerals as in FIG. 6. Numeral 19 designates a material of a certain permeability such as Ni-Fe alloy deposited with substantially the same thickness as the non-magnetic material 18 on the ferrite base plate 8. The non-magnetic material 18 and the high permeability material 19 are finished almost in alignment to each other to define a co-planar surface, and insulating material 20 such as $SiO_2$ is deposited to the thickness of about 0.5 $\mu$m on the resulting assembly. The insulating material 20 functions to prevent the bias current in the MR element 11 from flowing into the material 19. Obviously, this function is not required in the case where the material 19 is an insulating material.

By constructing the device in the above way, the magnetic fluxes generated by the signal magnetization of the medium 2 are applied through the upper end thereof, the material 19 and magnetic base plate 8, returns to the medium 2 and pass the soft magnetic material layer 3, as in the first embodiment. Further, the fabrication processes thereof, in which the MR element 11 is deposited on a flat surface, do not require a specially complicated technique.

A fourth embodiment will be explained. If a thin film of CoCr alloy having a good surface electric conductivity is used as the recording medium in the aforementioned embodiments, the current flowing in the MR element 11 also flows to the recording medium 2, and what is called an electric leak noise occurs undesirably in signal detection.

This point has been improved in the fourth embodiment described specifically below.

Figure 8:
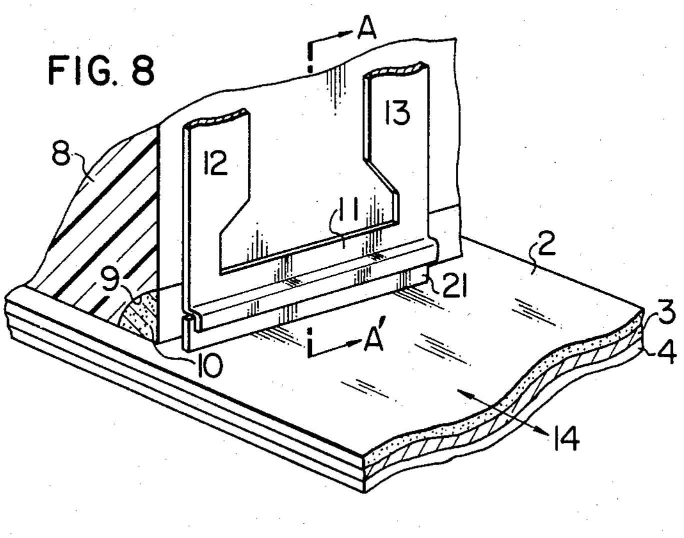
Figure 9:
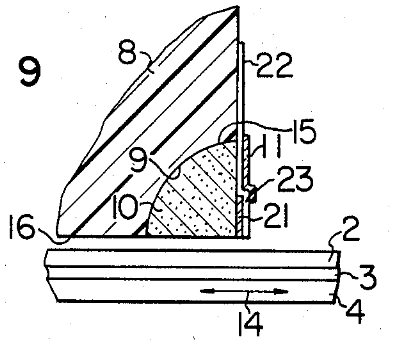
FIG. 9 is a sectional view taken in line A—A' in FIG. 8.

As shown in FIGS. 8 and 9, a recessed groove 9 is formed in the surface of an insulative magnetic base plate 8 such as ferrite, and the groove is filled with a non-magnetic material 10 to finish the new surface flush with the surface of the base plate 8. On this new surface, an Ni-Fe alloy or the like is deposited by the thickness of about 500 Å by appropriate evaporation means, and electrodes 12, 13 are arranged at longitudinal ends of a substantially rectangular-shaped MR element 11 by photoetching technique. The MR element 11 is disposed in parallel to the longitudinal direction of the groove 9. The upper end of the MR element 11 is magnetically coupled with the upper end 15 of the recessed groove 9 formed in the magnetic base plate, while the lower end of the MR element 11 is magnetically coupled with and is electrically insulated from the upper end of the high permeability retangular-shaped thin film 21 of substantially the same thickness. The high permeability thin film 21 which faces the recording medium 2 is arranged in parallel to the recessed groove 9, and an insulating film 22 is deposited on the resulting assembly. Then a magnetic thin film making up the MR element 11 is further deposited, thus constructing a magnetic coupling portion 23 therebetween.

The surface 16 approximately perpendicular to the MR element 11 faces the recording medium, and the arrow 14 indicates the direction of motion of the recording medium. The size of the recessed groove 9 along the direction of feed of the recording medium 2 is sufficiently larger than the wavelength recorded in the recording medium.

In the MR head thus constructed, the magnetic fluxes generated by signal magnetization of the perpendicular recording medium 2 having the soft magnetic material layer 3 deposited on the back surface thereof are introduced to the lower end of the flux guide comprised of the high permeability thin film 21, from the upper end thereof to the lower end of the MR element 11, from the upper end thereof to end portion 15 of the recessed groove 9 in the base plate 8, and through the flux return yoke comprised of base plate 8, to the surface 16 facing the recording medium, returns to the recording medium and further to the lower end of the high permeability thin film 21 via the soft magnetic material layer 3 on the back of the recording medium in order to complete a magnetic closed loop. As a result, the MR width loss in the MR-element alone type head is eliminated on the one hand, and by forming the high permeability thin film 21 to the same thickness as the MR element 11, the gap loss is also eliminated on the other hand. Further, even when combined with an electrically conductive recording medium, a thin film magnetic head free of electrical leaks is provided. Reference character L designates the size of overlap area of the MR element 11 and the high permeability thin film 21.

In order to attain a good short wavelength reproduction characteristic by the head mentioned above, the thickness of the high permeability thin film 21 is required to be reduced at a predetermined ratio as compared with the recording wavelength to be reproduced.

The thickness loss attributable to this thickness corresponds to the gap loss of the ring head, and is about 2 dB when $g/\lambda = \frac{1}{3}$, and about 4 dB when $g/\lambda = \frac{1}{2}$, as will be seen from the general formula representing the gap loss below.

$$Lg = 20 \log_{10} \frac{\sin(\pi g/\lambda)}{\pi g/\lambda}$$

where g is the gap length (thickness of the main pole), and λ is the recording wavelength. If $g/\lambda < \frac{1}{3}$, therefore, a satisfactory short wavelength reproduction characteristic is obtained with the thickness loss smaller than about 2 dB. Further, the size of the recessed groove 9 along the feeding direction of the recording medium 2 is required to be such as not to act as a gap of the magneto-resistive head of shield type against the recording wavelength to be reproduced by this head. Specifically, the gap length is desirably more than ten times longer than the recording wavelength. This range, as seen from the above formula, corresponds to the region where the reproduction output is reduced by more than 30 dB as compared with when $\lambda >> g$, so that it may be considered that the gap fails to function as that of the reproduction head. When the gap is as long as this, the magnetic fluxes leaking from the various points of the recessed groove 9 to the recording medium 2 are increased, thus substantially hampering the function as a ring head. In this way, by making the thickness t, of the high permeability thin film 21 lower than $\frac{1}{3}$ of the recording wavelength, and making the size of the recessed groove 9 more than ten times larger than the recording wavelength, a flat wavelength characteristic is obtained at or near the working wavelength region.

The characteristics of the saturation magnetic flux density and thickness of the high permeability thin film 21 and the MR element 11 are improved by satisfying the conditions mentioned below.

When the thickness $t_1$ of the high permeability thin film 21 is almost the same as the thickness $t_2$ of the MR element 11, the relation between the maximum magnetic flux density $Bm_1$ of the high permeability thin film 21 and the maximum magnetic flux density $Bm_2$ of the MR element 11 is required to be $Bm_1 \geqq 2Bm_2$, for the reason mentioned below.

Figure 10:
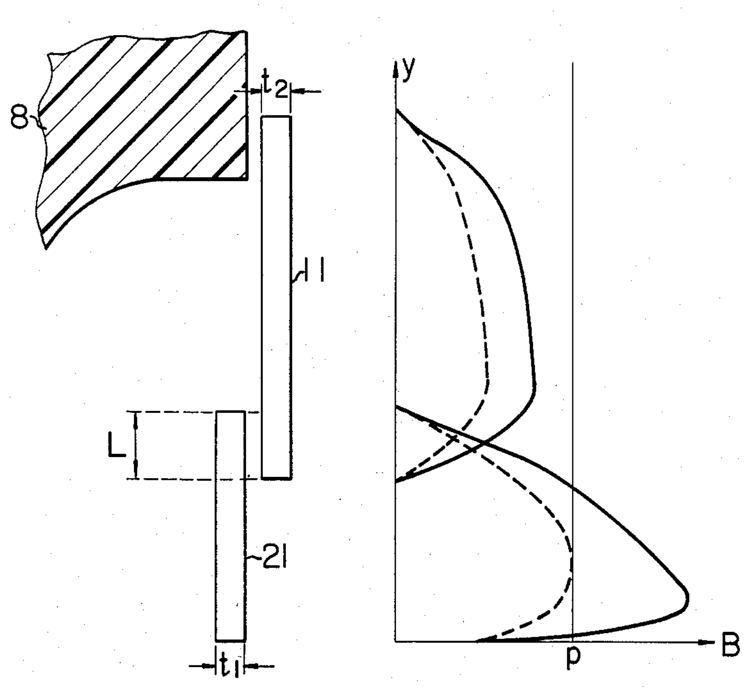
FIG. 10 is a diagram showing the distribution of magnetic flux density in the MR element and the thin films of high permeability of the fourth embodiment.

FIG. 10 shows the magnetic flux density distribution of the head section when the thickness $t_1$ of the high permeability thin film 21 is equal to the thickness $t_2$ of the magneto-resistive element 11. In this drawing, the ordinate represents the distance in direction y, and the abscissa the magnetic flux density. This is obtained by the analysis by "FEM" (finite element method) (Solid line). Consequently, it is seen that the magnetic flux density in the high permeability thin film 21 in contact with the recording medium 2 is considerably higher than the magnetic flux density in the MR element 11. In the analysis, the non-linearity of the hysteresis curve of the high permeability thin film and the magneto-resistive element is not considered. Actually, however, a saturation naturally occurs at the maximum magnetic flux density of the material. In the case where a material of which the maximum magnetic flux density is located at point P in FIG. 10 is selected as the high permeability thin film or MR element, for instance, the maximum magnetic flux density of the high permeability thin film 21 is given at point P and therefore the total amount of magnetic fluxes introduced to the high permeability thin film 21 and the MR element 11 is reduced, so that the magnetic flux density of these two components is reduced as shown by dashed line in FIG. 10. Thus, if the material constants of these components are selected in such a manner that the maximum magnetic flux density in the MR element 11 is limited not by the saturation magnetic flux density of the high permeability thin film 21 alone but by the saturation magnetic flux density of the MR element itself, the MR element 11 operates at the highest efficiency. This will be explained more in detail below.

Figure 11:
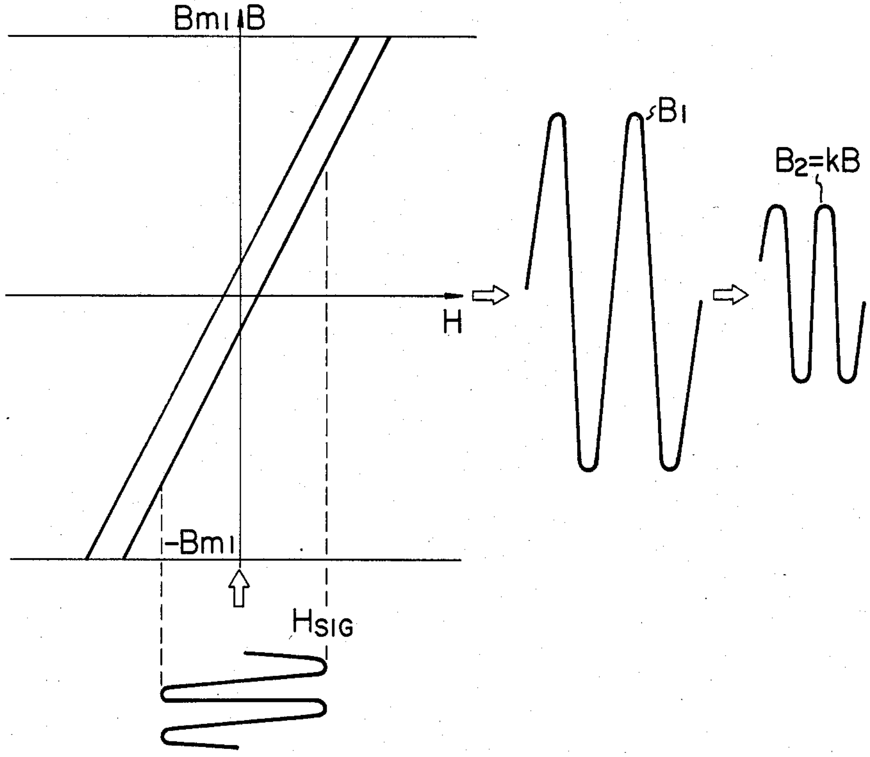
FIG. 11 is a diagram showing the relation between the magnetic characteristic of the thin films and the signal magnetic field.

FIG. 11 shows the magnetic characteristics of the high permeability thin film 21. In the drawing, Hsig designates the signal magnetic field, $B_1$ the maximum magnetic flux density in the high permeability thin film 21 with the signal magnetic field applied, and $B_2$ the maximum magnetic flux density in the MR element 11. Between $B_2$ and $B_1$, there is the relation $B_2=kB_1$, where $k=\frac{1}{2}$ as shown in FIG. 10.

Even when $B_2=Bm_2$ or in the case where the MR element 11 is impressed with a large magnetic field almost giving a magnetic saturation, the relation $B_1 \simeq 2B_2 \simeq 2Bm_2 \leqq Bm_1$ is established, so that $B_1$ is lower than $Bm_1$. Thus the high permeability thin film 21 is not magnetically saturated. In other words, in the embodiment mentioned above, the magnetic fluxes to the MR element 11 are not limited by the high permeability thin film 21, and therefore the utilization of the magnetic fluxes of the MR element 11 is not reduced.

If the relation $1<n<2$ holds unlike in the above-mentioned embodiment where $Bm_1 \geqq nBm_2$ $(n=2)$, the utilization of the magnetic fluxes of the MR element 11 is obviously improved as compared with the case where the high permeability thin film 21 and the MR element 11 are made of the same material such as permalloy $(n=1)$, although the effect as sufficient as in the above embodiment under consideration is not obtained.

Further, unlike in the above-mentioned where $t_1=t_2$, $t_1$ may be equal to $mt_2$ $(m>1)$ in which case n may take a smaller value. In other words, since the total amount of magnetic fluxes passing through the high permeability thin film 21 is $\phi_1 \propto t_1$ and the total amount of magnetic fluxes passing through the MR element 11 is given as $\phi_2 \propto t_2$, the relation $t_2B_2=kt_1B_1$ is obtained if $\phi_2=k\phi_1$ $(k \simeq \frac{1}{2})$. Thus, if $Bm_1 \geqq 2 \cdot t_2/t_1 \cdot Bm_2$, the same effect as in the above-mentioned embodiment is achieved.

Also, an improvement, though not sufficient, is obtained when $1<n<2$ as compared with when $Bm_1 \geqq n \cdot t_2/t_1\, Bm_2$ $(n=2)$.

The values of $t_1$ and $t_2$, however, have limitations as described below. The thickness $t_2$ of the MR element 11 of about 300 to 500 Å is known to exhibit the highest magneto-resistance. The greater the value of $t_1$ as compared with $t_2$, the value of $Bm_1$ may be smaller. Since the thickness loss corresponding to the gap loss occurs in correspondence with the size of $t_1$ as mentioned above, however, the value $t_1$ may not be more than 0.2 μm ($t_1>0.2$ μm) if the recording wavelength is 0.6 μm. Permalloy is a common material of the MR element 11. If $t_1$ is larger than $t_2$ $(t_1>t_2)$ and $Bm_1$ is equal to $Bm_2$, the permalloy is also suitable as a material of the high permeability member 21. In the case where $Bm_1$ is larger than $Bm_2$ with the value $t_1 \simeq t_2$, however, an amorphous material with a larger value of Bm is more suitable.

Some amorphous materials are more excellent in wear resistance than permalloy, and in this respect, are advantageously used for the medium sliding portion.

In the MR head of the construction shown in FIGS. 3 and 4, the reproduction efficiency depends not solely on the efficiency of a magnetic circuit but also depends on an electrical efficiency dependent upon the fact that since the MR element 11 is magnetically coupled with the high permeability member 8 by being partially overlapped with the latter in a plane, the overlapped region 17 is not expected to have the magneto-resistive effect so that the resistance change of the MR element as a whole is reduced. This electrical efficiency naturally decreases with an increase of the area of the overlapped portion. In that case, however, the magnetic efficiency is increased. The reproduction efficiency of the magneto-resistive head, which is the product of these two efficiencies, is expected to be maximized by appropriately setting the ratio between the overlapped area and whole area of the MR element 11.

Figure 12:
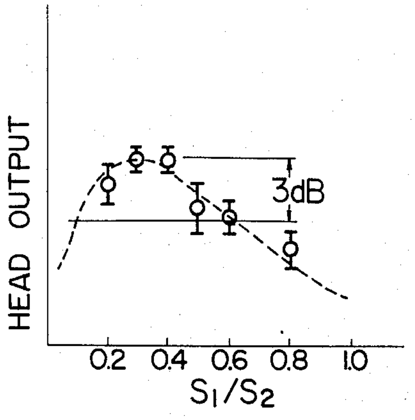
FIG. 12 is a diagram showing data on measurements of the change of the reproduction characteristic by the change of overlapped area of the MR element and the material of high permeability in the head of the first embodiment of the present invention.

FIG. 12 shows the reproduction output of heads of different areas of overlapped portions, as plotted against the ratio between the area $S_1$ of the overlapped portion and the area $S_2$ of non-overlapped portion. It will be seen that the maximum output is obtained at about 0.3 to 0.4 of $S_1/S_2$. The dashed line in the drawing indicates the result of an approximation calculation, which indicates a considerable coincidence. From the viewpoint of system configuration, the output variations of less than −3 dB are desirable, and therefore, a magneto-resistive head of high reproduction efficiency is obtained by constructing the magneto-resistive head in the range $0.1<S_1/S_2<0.6$.

Figure 13:
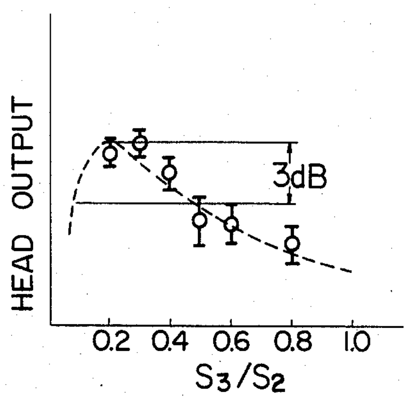
FIG. 13 is a diagram showing data on measurements of the change of the reproduction characteristic by the change of superimposition amount of the magneto-resistive element and the thin films of high permeability in the head of the fourth embodiment of the present invention.

In the case of the magneto-resistive head of the construction as shown in FIGS. 8 and 9, a similar phenomenon is observed also in the overlapped portion 23 of the MR element 11 and the high permeability thin film 21 in addition to the conditions described above. FIG. 13 shows the reproduction output of the MR head plotted against different ratios between the area $S_2$ and the area $S_3$ of the overlapped portion of the MR element 11 and the high permeability thin film 21. As seen, the maximum output is obtained at or near the value of the ratio $S_3/S_2$ equal to 0.3. If the variation less than −3 dB is allowed, the range is $0.1<S_3/S_2<0.5$. If this range is satisfied, an MR head with a high output and small variations is obtained.

Still another embodiment of the magneto-resistive head of this construction in which the deterioration of the characteristics by wear is obviated will be explained below.

Figure 14:
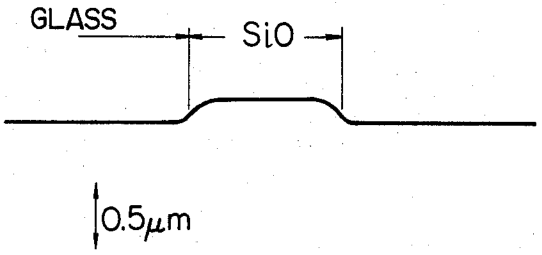
FIG. 14 shows a condition of non-uniform wear caused by the feed of the recording medium in the case where the recessed groove is filled with glass of a low melting point and SiO is deposited by evaporation as a protective film.

The magneto-resistive head described above, though suitable for reproduction of the perpendicular magnetization, uses glass of comparatively low melting point suitable as the non-magnetic material to fill in the recessed groove 10 in the general method of fabrication which may be employed for the thin film head. A process conceivable for this purpose is to form the protective thin film 24 of FIG. 15 thickly by evaporation of SiO or the like in close contact with the thin film portion. When the recording medium runs on the head surface of this construction, considerable unevennesses or roughnesses are caused by deviated wear as shown in FIG. 14, with the result that the protective film of SiO projects by about 0.1 to 0.2 μm from the glass filled portion. Thus a great space loss is caused at the time of reproduction of the shortwavelength signals, which reproduction capability is a feature of the perpendicular magnetic recording, thereby making it impossible to fully take advantage of the high recording density characteristic of the magneto-resistive head.

Figure 15:
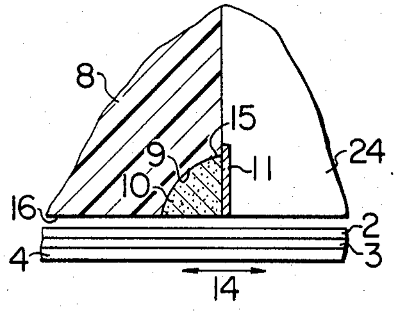
FIG. 15 shows another embodiment improved to eliminate such a non-uniform wear.

Another embodiment improved in this respect is shown in FIG. 15. The device shown in the Figure is fabricated in such a way that after the surface of an insulative base plate 8 such as of ferrite is ground, those portion except for the portion which is to be the groove is covered with a photo-resist by photoeching so that a groove of a desired depth (about 5 μm) plus a lapping margin (about 5 μm) is formed by use of electrolytic etching technique. After removing the photoresist, the non-magnetic material 10 such as of SiO is formed to the thickness at least more than the depth of the groove. Then, the surface of the non-magnetic material 10 in the groove 9 such as SiO is finished by lapping flush with the surface of the ferrite base plate 8 and with the desired depth of the groove. On the surface of the resulting assembly, Ni-Fe alloy or the like is deposited to the thickness of about 500 Å by appropriate evaporation means, and electrodes are arranged at longitudinal ends of the MR element 11 by photoeching process in such a manner that the MR element 11 is provided in parallel to the longitudinal direction of the recessed groove 9. Then in order to protect the MR element 11, the SiO protective film 24 is formed to the thickness of more than 10 μm by appropriate evaporation means.

The magneto-resistive head fabricated in this way is capable of efficiently reproducing the high-density perpendicular magnetization of submicrons bit length by the operation mentioned above. At the same time, when the recording medium is fed, the roughness which otherwise might be caused by such deviated wear near the high-permeability thin films is not caused due to the fact that the non-magnetic members 10, 24 provided on both sides of the high permeability thin film are made of the same material. The forward end of the high permeability thin film on the recording medium side is thus kept in constant stable contact with the recording medium, and therefore large shortwavelength-loss does not occur unlike in the prior art, thus producing a reproduction characteristic of very high resolution.

By using a material having Vickers hardness at least equal to that of the ferrite material such as SiO as a material for the non-magnetic members on both sides of the high permeability thin film and also by using the ferrite for the high permeability base plate as mentioned above, it is possible to obtain a thin film magnetic head, which, in addition to the advantages described above, has a very superior wear resistance.

Figure 16:
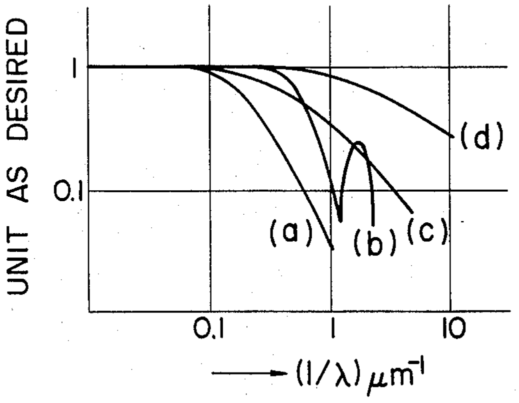
FIG. 16 is a diagram comparing the wavelength characteristics of various MR heads including the improved head of FIG. 15.

FIG. 16 shows the wavelength response of this improved magnetic head is compared with that of the conventional magnetic heads. The reciprocal of the wavelength λ corresponding to the frequency is plotted in abscissa, and the relative output in ordinate. The curve a represents the characteristic of the MR element-alone type magneto-resistive head, the curve b that of the shield-type magneto-resistive head, the curve c that of the magneto-resistive head earlier proposed in which Vickers hardness of the non-magnetic materials on both sides of the high permeability thin film are considerably different, and the curve d that of the magneto-resistive head according to the above-improved embodiment. In the Figure, the space loss between the head and the recording medium, which is common to all the heads, is disregarded.

Figure 17:
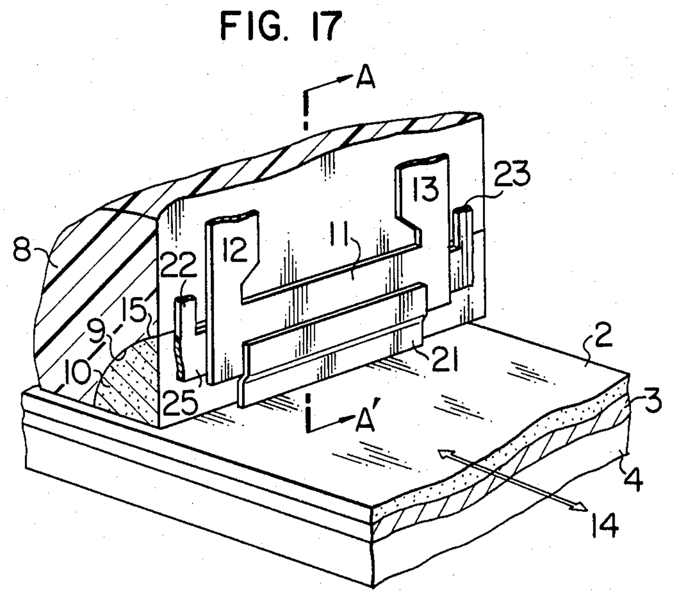
FIG. 17 is a diagram showing another embodiment in which the MR element of the fourth embodiment is impressed with a bias magnetic field.
Figure 18A:
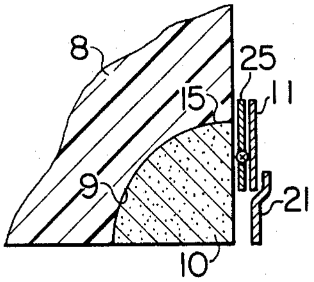
FIGS. 18 (*a*) to 18 (*d*) are diagrams showing embodiments in which the MR elements of the first and fourth embodiments are respectively impressed with a bias magnetic field.
Figure 18B:
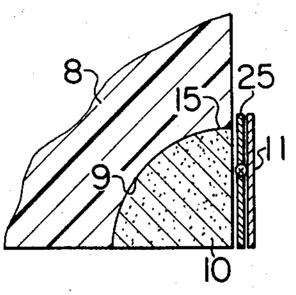
Figure 18C:
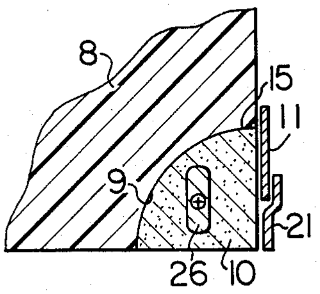
Figure 18D:
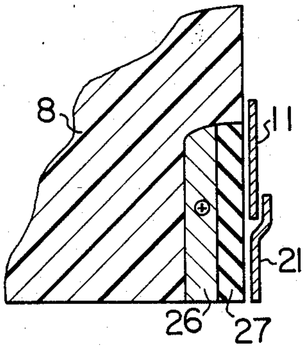

Next, an embodiment employing a bias system for reducing the non-linear distortion of the magneto-resistive element will be described. As shown in FIG. 17, the recess formed in the surface of an insulative base plate or substrate 8 such as of ferrite is filled with a non-magnetic material 10 such as glass to finish flush with the surface of the substrate 8. A conductive material such as Al, Au or Cu is provided to cover the resulting new surface by such means as evaporation thereby to form a biassing conductor layer 25 in parallel to the recess 9 by photoetching. An Ni-Fe alloy is deposited on the resulting assembly to the thickness of about 500 Å by evaporation means through an insulating layer (not shown). Electrodes 12 and 13 are arranged at longitudinal ends of the MR element 11 by photoetching process so that the MR element 11 is arranged along the longitudinal direction of the recessed groove 9. An upper end of the MR element 11 is magnetically coupled with the end 15 of the recessed groove 9 in the magnetic substrate, while the lower end of the MR element 11 is magnetically coupled with and electrically insulated from the upper end of the high permeability thin film 21 of substantially the same thickness through an insulating layer (not shown).

The surface of a double-layered perpendicular recording medium including a high-permeability thin film 3 such as of an Ni-Fe alloy and a vertically magnetized medium 2 such as of Co-Cr deposited thereon, which medium is disposed on the base member 4, faces the lower end of the high permeability thin film 21, so that the recording medium is fed along the direction of the arrow 14 thereby to reproduce the vertically magnetized signals.

For easier understanding of the construction of the magnetic head according to the present invention, a sectional view taken in line A—A' at the central part of the MR element 11 is shown in FIGS. 18 (*a*) to (*d*) to indicate the relative positions of the biassing conductor layer 25 and a conductor 26.

FIG. 18 (*a*) shows a sectional view of the biassing conductor layer 25 arranged between the MR element 11 and the magnetic base plate 8 in parallel to the former. A current flowing in the conductor layer 25 causes a bias material field to be efficiently applied to the MR element 11 in a closed loop including the MR element 11, high permeability thin film 21, high permeability thin film 3 on the back of the perpendicular magnetized medium and magnetic substrate 8. The biassing conductor layer 25 and the MR element 11 are electrically isolated from each other completely by an insulating layer, thus making possible stable impression of the bias magnetic field. FIG. 18 (*b*), on the other hand, shows a sectional view of the biassing conductor layer 25 also arranged intermediate of the MR element 11 and the magnetic substrate 8 in parallel to the former, wherein the MR element 11 is efficiently biased by the current flowing in the conductor layer 25 through a closed loop including the MR element 11, high permeability thin film 3 on the back of the double-layered recording medium and magnetic substrate 8. In this case, too, the bias conductor 25 and the MR element 11 are free of gap loss and electrical leaks, even if the insulating layer (not shown) is made sufficiently large.

FIG. 18 (*c*) shows a sectional view of the bias conductor 26 molded in the recess 9 of the base plate by glass or the like. The current flowing in the conductor 26 causes a bias magnetic field to be applied to the MR element 11 through the high permeability thin film 21, high permeability thin film 3 in the perpendicular magnetic recording medium and magnetic substrate 8.

FIG. 18 (*d*) shows a sectional view of the biassing conductor layer 26 formed in the recessed groove of the substrate, on which a wear-resistant insulating layer 27 of such a material as SiO or $SiO_2$ is deposited, and further formed thereon are the MR element 11 and the high permeability thin film 21. This construction poses no problem of electrical leaks since the conductor layer 26 is completely isolated electrically from the MR element 11.

Although the above-mentioned embodiments use a magnetic substrate or base plate, the concept of the present invention is not limited to the use of the magnetic substrate or base plate. It is obvious, for example, that a magnetic thin film may be deposited on a nonmagnetic substrate and an insulating layer is deposited thereon to an appropriate thickness only at a predetermined portion thereby to construct a perpendicular magnetization playback head with an equal effect.

Description will be made about a further embodiment in which any external magnetic field is not used for biasing.

Figure 19:
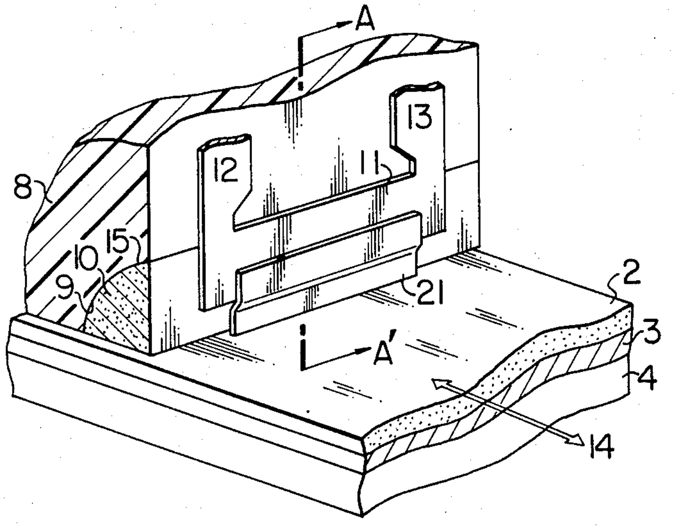
FIG. 19 (*a*) is a diagram showing still another embodiment using another biasing method different from the external magnetic field for the MR element.
Figure 19:
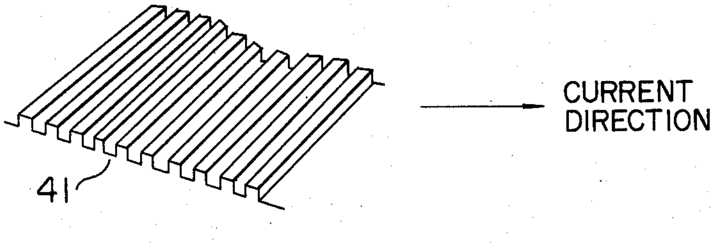

As shown in FIG. 19 (*a*), a recessed groove 9 is formed in the surface of an insulating substrate 8 of such a material as ferrite and is filled with a nonmagnetic material 10 such as glass to be finished flush with the surface of the substrate 8. On the resulting finished surface, grating-like portions are formed at predetermined regular intervals with their direction making a certain angle to the direction of electric current flowing through the MR element 11. For example, as shown in FIG. 19 (*b*) a provision is made of a foundation 41 of the magneto resistive thin film, having grooves of constant period in the different direction from that of the electric current in the magneto resistive thin film. An Ni-Fe alloy is further deposited to the thickness of about 500 Å on the assembly by appropriate evaporation means so that electrodes 12 and 13 are arranged at longitudinal ends of the MR element 11, while disposing the MR element 11 in parallel with the recessed groove 9. The upper end of the MR element 11 is magnetically coupled with the end of the recessed groove 9 formed in the magnetic substrate, while the lower end of the MR element 11 is electrically isolated from and magnetically coupled with the upper end of the high permeability thin film 21 of substantially the same thickness via an insulating film (not shown). The surface of a double-layered perpendicular recording medium having a high-permeability thin film 3 of such a material as Ni-Fe alloy and a vertical magnetization medium 2 of such a material as Co-Cr deposited thereon, which medium is disposed on a base member, faces the lower end of the high permeability thin film 21, so that the medium is fed in the direction of the arrow 14 thereby to reproduce the perpendicularly magnetized signals.

Consequently, an anisotropic magnetic field is obtained in which the axis of easy magnetization of the MR element is inclined and held at an angle to the direction of current.

The grating-like structure may of course be formed alternatively on the insulating layer.

The construction of the magnetic head according to the present invention is such that, being a closed loop construction, the demagnetizing factor is reduced, thus making it possible to hold the inclined condition even when the anisotripic magnetic field is comparatively small. On the other hand, the smaller the anisotropic magnetic field the higher the read-out sensitivity of the magnetic head.

Figure 20:
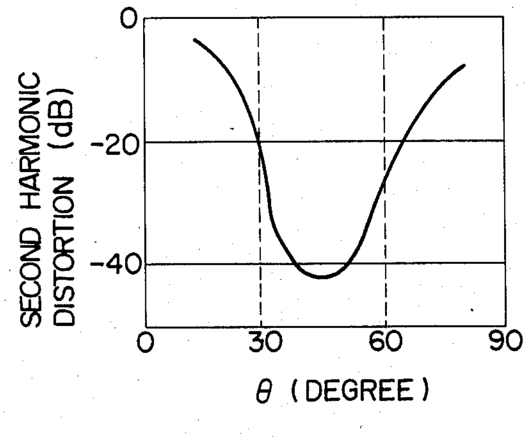
FIG. 20 is a diagram showing the relation between the angle of the axis of easy magnetization to the direction of current in the MR element of the embodiment of FIG. 19 (*a*) and the second higher harmonic distortion of the reproduction output of the playback head.

Assuming that the axis of easy magnetization forms an angle $\theta$ with the direction of current of the MR element 11, the operation can be realized with a reduced second high harmonics distortion from the MR element 11 by setting the angle $\theta$ in the range $30° \lesssim \theta \lesssim 60°$ as shown in FIG. 20.

Figure 21:
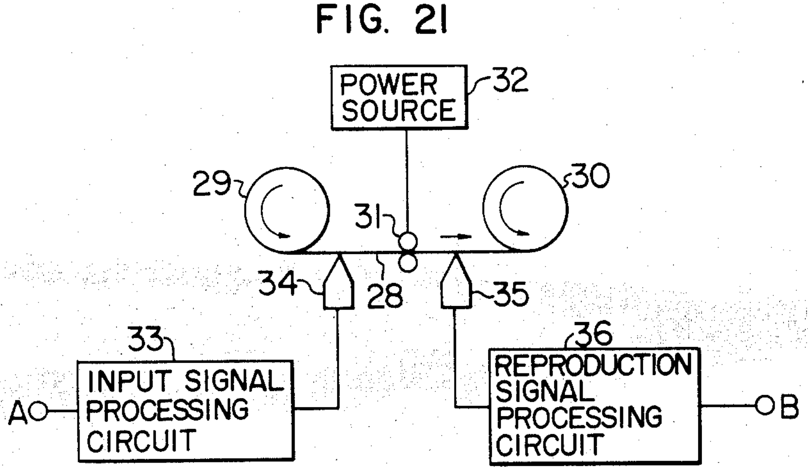
FIG. 21 shows a magnetic recording and reproducing device using a playback head according to the present invention.

A magnetic recording and reproducing device using the perpendicular magnetization playback head and reproduction system explained with reference to the first embodiment above will be described. In FIG. 21, reference numeral 28 designates a double-layered perpendicular magnetic recording tape, numeral 29 a supply reel wound with the tape, and numeral 30 a take-up reel wound with the same tape. Numeral 31 designates a capstan, and numeral 32 a power source for rotating the capstan. In this configuration, the tape 28 is fed in the direction of the arrow, and the reels 29 and 30 are rotated in the direction of the arrows respectively. Reference character A designates an input signal terminal, numeral 33 an input signal processing circuit including a recording amplifier, and numeral 34 a recording head. Numeral 35 designates a magneto-resistive type head, numeral 36 a reproduction signal processing circuit including a reproduction amplifier, and character B an output signal terminal.

An input signal to be recorded such as an audio signal is applied to the input signal terminal A, converted into a digital signal by an analog-digital converter in the input signal processing circuit 33, encoded by, say, MFM or 3PM, and through a recording head drive circuit, is applied as a signal current to the recording head 34. The perpendicular recording tape 28 is fed at a constant speed by the drive source 32 and the capstan 31, and therefore the signal is recorded sequentially in the magnetic tape 28. The magneto-resistive playback head 35, on the other hand, is responsive to the signal magnetic field in the tape, and the output thereof is amplified and decoded by the reproduction signal processing circuit 36, followed by digital-analog conversion. The resulting signal is produced as an output signal at terminal B.

Figure 1A:
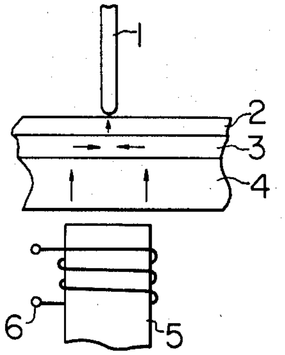
FIGS. 1 (*a*) and 1 (*b*) are diagrams showing conventional perpendicular magnetic recording and reproducing heads of single magnetic pole type and ring head type respectively.
Figure 1B:
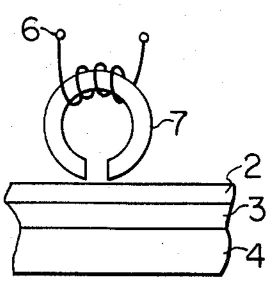
Figure 2:
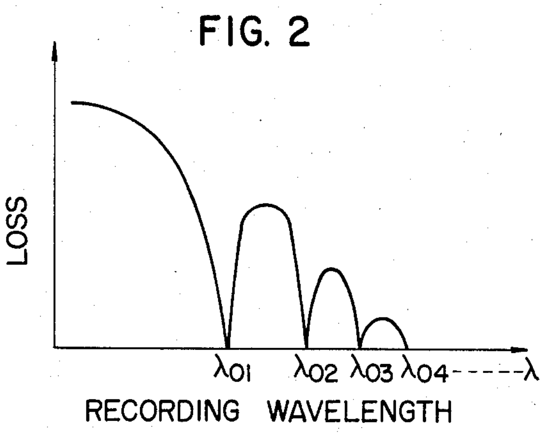
FIG. 2 is a diagram showing a wavelength characteristic of reproduction response of the conventional perpendicular magnetization playback head shown in FIG. 1.

The perpendicular recording head shown in FIG. 1 (*a*) or the ring recording head shown in FIG. 1 (*b*) may be used as desired. On the other hand, a head (magneto-resistive head) using a magneto-resistive element is used a a playback head. The magneto-resistive head, in which the magnitude of the reproduction signal is not dependent on the relative speeds of the head and medium unlike in the head of windingtype shown in FIGS. 1 (*a*) and 1 (*b*), is advantageously used with a recording and reproducing device of low tape speed. Also, in view of the fact that the thickness of the MR element 11 is capable of being reduced to the order of several hundred Å, the thickness loss and the gap loss mentioned above can be substantially obviated.

Instead of using the playback head of the type shown in the first embodiment for a recording and reproducing appliance, the head described with reference to the second and subsequent embodiments may of course be used as a playback head with the magnetic recording and reproducing device according to the present invention.

What is claimed is:

1. A magnetic playback head for playback of recorded signals having maximum and minimum wavelengths from a double layered perpendicular magnetic recording medium including a high-permeability layer disposed on a base film and a high-coercivity layer with an axis of easy magnetization in the direction of its thickness disposed on said high-permeability layer, said playback head comprising:

magneto-resistive element means, with a thickness smaller than one-third of said minimum wavelength, said element means located in a plane substantially orthogonal to an operative surface of the head, said operative surface comprised of a surface facing said recording medium upon playback, said magneto-resistive element means having a longitudinal direction parallel to said operative surface, said magneto-resistive element means including one edge being exposed to said recording medium at said operative surface;

means for supplying a magneto-resistivity sensing current to said magneto-resitive element means, with a direction of said sensing current being substantially parallel to said longitudinal direction;

a high-permeability flux return yoke means, having at least two end portions, one end portion thereof being magnetically coupled to a side edge portion of said magneto-resistive element means furthest from said operative surface, and another end portion exposed to said operative surface, for forming, during playback and in close proximity to said magnetic recording medium, a substantially closed magnetic path with said magneto-resistive element means and said high-permeability layer of the recording medium; and a non-magnetic separating means, located between a portion of said yoke means and a portion of said magneto-resistive element means with a portion of said separating means exposed to said recording medium, for defining a gap having a dimension between said magneto-resistive element means and said flux return yoke means, said dimension being greater than ten times said maximum wavelength.

2. The magnetic playback head according to claim 1, wherein said flux return yoke means is comprised of a magnetic substrate, said substrate including a groove therein, and said separating means is comprised of a non-magnetic material located in said groove.

3. The magnetic playback head according to claim 1, wherein said flux return yoke means comprises a magnetic substrate and said separating means is comprised of a non-magnetic layer disposed disposed on said magnetic substrate, and said magneto-resistive element means is disposed over said non-magnetic layer and said magnetic substrate.

4. The magnetic playback head according to claim 3, further comprising a magnetic leveling layer with a thickness substantially equal to a thickness of said non-magnetic layer, said leveling layer being disposed between said magnetic substrate and said magneto-resistive element means, wherein said magneto-resistive element means is located on a substantially flat plane formed by said leveling layer and said non-magnetic layer.

5. The magnetic playback head according to claim 1, further comprising a means for applying a magnetic bias field to said magneto-resistive element.

6. The magnetic playback head according to claim 5, wherein said flux return yoke means is comprised of a magnetic substrate having a groove therein, and said separating means comprised of a non-magnetic material located in said groove, and said means for applying a magnetic bias field is comprised of an electric conductor buried in said non-magnetic material and a bias current supplying means connected to said electric conductor.

7. The magnetic playback head according to claim 5, wherein said flux return yoke means is comprised of a magnetic substrate and said separating means is comprised of a non-magnetic layer disposed on said magnetic substrate, said magneto-resistive element means is disposed over said non-magnetic layer and said magnetic substrate, and said means for applying a magnetic bias field is comprised of an electric conductor layer disposed between said magneto-resistive element means and said non-magnetic layer and a bias current supplying means connected to said electric conductor layer.

8. The magnetic playback head according to claim 1, wherein said magneto-resistive element means includes a corrugation with a direction of said corrugation being inclined from said direction of the magneto-resistivity sensing current.

9. The magnetic playback head according to claim 1, wherein said magneto-resistive element means has an axis of easy magnetization, said axis having a direction which is inclined from said direction of the magneto-resistivity sensing current.

10. The magnetic playback head according to claim 1, wherein an area $S_1$ of said magneto-resistive element means is in magnetic coupling with said flux return yoke means, and an area $S_2$ of said magneto-resistive element means is the remainder area other than said area $S_1$ and the ratio $S_1/S_2$ satisfies the relationship 0.1 less than $S_1/S_2$ which is less than 0.6.

11. A magnetic playback head for playback of recorded signals having maximum and minimum wavelengths from a double layered perpendicular magnetic recording medium inciuding a high-permeability layer disposed on a base film and a high-coercivity layer within an axis of easy magnetization in the direction of its thickness disposed on said high-permeability layer, said playback head comprIsing:

high-permeability flux guide means with a thickness smaller than one-third of said minimum wavelength, said flux guide means located in a plane substantially orthogonal to an operative surface of the head, said operative surface comprised of a surface facing said recording medium upon playback, said flux guide means having a longitudinal direction parallel to said operative surfaces, and said flux guide means having one edge in proximity to said operative surface;

magneto-resistive element means having a longitudinal direction parallel to said flux guide means longitudinal direction, said magneto-resistive element located recessed from said operative surface, and a portion of said magneto-resistive element means nearest said operative surface overlaps and is magnetically coupled with a portion of said flux guide means most recessed from said operative surface;

means for supplying a msgneto-resistivity sensing current to said magneto-resistive element means, witH a direction of said sensing current being substantially parallel to said longitudinal directions;

high-permeability flux return yoke means, having at least two end portions, one end portion thereof being magnetically coupled to a side edge portion of said magneto-resistive element means furthest from said operative surface, and another end portion thereof exposed to said operative surface, for forming, during playback and in close proximity to said magnetic recording medium, a substantially closed magnetic path of said flux guide means, said magneto-resistive element means and said high-permeability layer of said recording medium;

non-magnetic separating means, located between a portion of said yoke means and a portion of said flux guide means, for defining a gap having a dimension between said flux guide means and said flux return yoke means substantially adjacent said operative surface, said dimension greater than ten times said maximum wavelength.

12. The magnetic playback head according to claim 11, wherein said flux return yoke means is comprised of a magnetic substrate, said magnetic substrate including a groove therein and said separating means is comprised of non-magnetic material located in said groove.

13. The magnetic playback head according to claim 11, wherein said flux return yoke means comprises a magnetic substrate and said separating means is comprised of a non-magnetic layer disposed on said magnetic substrate, and said flux guide means and said magneto-resistive element means are disposed over said non-magnetic layer and said magnetic substrate.

14. The magnetic playback head according to claim 13, further comprising a magnetic leveling layer with a thickness substantially equal to a thickness of said non-magnetic layer, said leveling layer being disposed between said magnetic substrate and said magneto-resistive element means wherein said magneto-resistive element means is located on a substantially flat plane formed by said leveling layer and said non-magnetic layer.

15. The magnetic playback head according to claim 11, further comprising a means for applying a magnetic bias field to said magneto-resistive element.

16. The magnetic playback head according to claim 15, wherein said flux return yoke means is comprised of a magnetic substrate having a groove therein, and said separating means is comprised of a non-magnetic material located in said groove, and said means for applying a magnetic bias field is comprised of an electric conductor buried in said non-magnetic material and a bias current supplying means connected to said electric conductor.

17. The magnetic playback head according to claim 15, wherein said flux return yoke means is comprised of a magnetic substrate and said separating means is comprised of a non-magnetic layer disposed on said magnetic substrate, said flux guide means and said magneto-resistive element means are disposed over said non-magnetic layer and said magnetic substrate, and said means for applying a magnetic bias field is comprised of an electric conductor layer disposed between said non-magnetic layer and said magneto-resistive element means and a bias current supplying means connected to said electric conductor layer.

18. The magnetic playback head according to claim 11, wherein said magneto-resistive element means includes a corrugation with a direction of said corrugation being inclined from said direction of the magneto-resistivity sensing current.

19. The magnetic playback head according to claim 11, wherein said magneto-resistive element means has an axis of easy magnetization, said axis having a direction which is inclined from said direction of the magneto-resistivity sensing current.

20. The magnetic playback head according to claim 11, wherein said flux guide means has a thickness $t_1$, said magneto-resistive element means has a thickness $t_2$, said flux guide means has a maximum flux density $B_{m1}$ and said magneto-resistive element means has a maximum flux density $B_{m2}$ which satisfies the relationship $t_2 \times B_{m1}$ is greater than $t_2 \times B_{m2}$.

21. The magnetic playback head according to claim 11, wherein an area $S_1$ of said magneto-resisitive element means is in magnetic coupling with said flux return yoke means and an area $S_2$ of said magneto-resistive element means is the remainder area other than said area $S_1$ wherein said ratio $S_1/S_2$ satisfies the relationship 0.1 is less than $S_1/S_2$ which is less than 0.6.

22. The magnetic playback head according to claim 21, wherein an area $S_3$ of said magneto-resistive element means is in magnetic coupling with said flux guide means, and said ratio $S_3/S_2$ satisfies the relationship 0.1 is less than $S_3/S_2$ which is less than 0.5.

* * * * *